(12) United States Patent
Klein

(10) Patent No.: US 7,782,038 B2
(45) Date of Patent: Aug. 24, 2010

(54) SOFT START CIRCUIT WITH SLEW RATE CONTROLLER FOR VOLTAGE REGULATORS

(75) Inventor: Jonathan Klein, Palo Alto, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 522 days.

(21) Appl. No.: 11/726,939

(22) Filed: Mar. 23, 2007

(65) Prior Publication Data

US 2008/0232144 A1    Sep. 25, 2008

(51) Int. Cl.
*G05F 1/00* (2006.01)
(52) U.S. Cl. .................... 323/285; 323/901; 363/49
(58) Field of Classification Search .............. 323/49, 323/901, 908, 282, 283, 285; 363/49
See application file for complete search history.

(56) References Cited

U.S. PATENT DOCUMENTS

| 4,016,471 | A | * | 4/1977 | Matsumoto et al. | 318/629 |
| 4,402,028 | A | * | 8/1983 | Udren | 367/36 |
| 5,617,051 | A | * | 4/1997 | Bingham | 327/317 |
| 5,838,524 | A | * | 11/1998 | Phillips | 361/18 |
| 6,025,704 | A | * | 2/2000 | Elliott | 323/280 |
| 2005/0010826 | A1 | * | 1/2005 | Pullen et al. | 713/300 |
| 2005/0242668 | A1 | * | 11/2005 | Cividino et al. | 307/58 |
| 2006/0227478 | A1 | * | 10/2006 | Herr et al. | 361/93.1 |
| 2007/0001655 | A1 | * | 1/2007 | Schiff | 323/246 |

OTHER PUBLICATIONS

FAN2011/FAN2012 1.5A Low Voltage Current Mode Synchronous PWM Buck Regulator, Apr. 2006, pp. 10, Rev.1.0.4. Webpage [online] [retrieved on Apr. 19, 2007]. Retrieved from the Internet: <http://www.fairchildsemi.com/ds/FA/FAN2011.pdf>.
FAN5068 DDR-1/DDR-2 plus ACPI Regulator Combo, Sep. 9, 2004, 18 sheets, Rev. 1.0.1. Webpage [online] [retrieved on Apr. 19, 2007]. Retrieved from the Internet:: <http://www.fairchildsemi.com/ds/FA/FAN5068.pdf>.

* cited by examiner

*Primary Examiner*—Harry Behm
*Assistant Examiner*—Matthew Grubb
(74) *Attorney, Agent, or Firm*—Okamoto & Benedicto LLP

(57) ABSTRACT

In one embodiment, a soft start circuit includes a slew rate controller to limit inrush current to a voltage regulator during start up. The output voltage of the regulator may be compared to a previous sampled value to determine the slew rate of the output voltage. The slew rate of the output voltage may be controlled by adjusting the current limit of the regulator. The current limit of the regulator may be adjusted using digital circuits, such as a counter and a digital to analog converter, or analog circuits using a pulsed current source, for example. The slew rate may be controlled to exceed a target slew rate or to stay within a range of slew rate limits.

20 Claims, 6 Drawing Sheets

US 7,782,038 B2

SOFT START CIRCUIT WITH SLEW RATE CONTROLLER FOR VOLTAGE REGULATORS

BACKGROUND OF THE INVENTION

1. Field of the Invention

The present invention relates generally to electrical circuits, and more particularly but not exclusively to voltage regulators.

2. Description of the Background Art

As its name implies, a voltage regulator regulates voltage delivered to a load. As shown in the example of FIG. 1, a typical voltage regulator draws input current ($I_{IN}$) from a power source to generate a corresponding output current ($I_{out}$). The output current charges an output capacitor ($C_{OUT}$) that provides power to the load ($R_{LOAD}$). The load is depicted in FIG. 1 as a resistive load for ease of illustration, but may also be non-resistive in other cases. The power source is typically a battery in mobile applications, or the output of an AC to DC converter.

Inrush current is the input current required to charge the output capacitor. At start up, such as when the regulator comes back up from a power OFF state, the output capacitor is discharged. Thus, at start up, the regulator has to generate enough output current to charge the output capacitor ($I_{CHG}$) and supply current to the load ($I_{LOAD}$). $I_{CHG}$ is determined by the slew rate (dV/dt) of the output capacitor's voltage. Unless the slew rate is carefully controlled, the inrush current may get overly high—possibly enough to overload the battery or other power source, causing other devices in the system to lose their ability to regulate. Also, because there may be many integrated circuits starting at the same time when the power source is connected or when the system is enabled, it is important for the regulator to minimize current drawn from the power source during start up. A soft start circuit limits inrush current to prevent these problems associated with voltage regulators during start up.

Many different approaches have been developed to limit inrush current. One approach clamps the output of the voltage regulator's error amplifier to a slow ramp to limit the regulator's duty cycle. Another approach slaves the regulator's output to a slow ramp using the same closed loop control as that of a pulse width modulator during normal operation. Both of these approaches suffer from output ringing at the end of the start up sequence and repetitive current limit hits at the beginning of the start up. These approaches in synchronous buck circuits also can discharge the output capacitor if start-up occurs with a partially charged output capacitor, which can occur during momentary power outages. Yet another approach runs the regulator at a fixed current limit until its output reaches the regulated output. This approach results in a large output overshoot at the end of the start up. Worse, if the fixed current limit is lower than the regulator's maximum output current, the regulator may not start up properly (or at all) with some loads. Yet another approach steps or ramps the regulator's current limit in fixed time increments. This approach also has its share of problems, including output overshoot at the end of the start up and variability in start up times.

Accordingly, an improved soft start circuit is needed.

SUMMARY

In one embodiment, a soft start circuit includes a slew rate controller to limit inrush current to a voltage regulator during start up. The output voltage of the regulator may be compared to a previous sampled value to determine the slew rate of the output voltage. The slew rate of the output voltage may be controlled by adjusting the current limit of the regulator. The current limit of the regulator may be adjusted using digital circuits, such as a counter and a digital to analog converter, or analog circuits using a pulsed current source, for example. The slew rate may be controlled to exceed a target slew rate or to stay within a range of slew rate limits.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
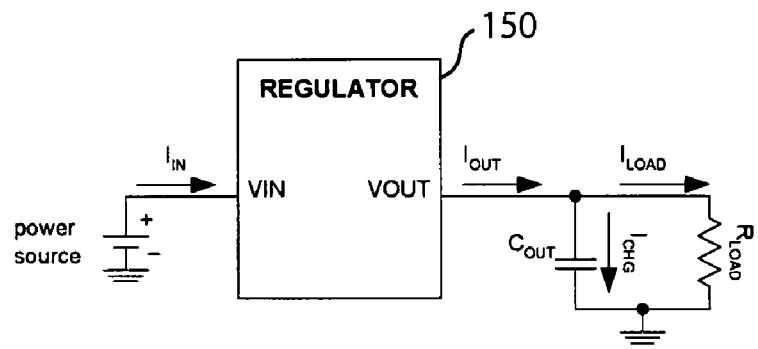
FIG. 1 schematically shows a typical voltage regulator.

In FIG. 1, the input current may be related to the output current during start up by, $$I_{IN} = I_{OUT} = I_{LOAD} + I_{CHG} \tag{EQ.1}$$

where $I_{IN}$ is the input current, $I_{OUT}$ is the output current, and $I_{CHG}$ is the current charging the output capacitor. From EQ. 1, the slew rate of the output voltage is related to the current charging the capacitor by, $$I_{CHG} = COUT \cdot \frac{dV}{dT} \quad \text{(EQ. 2)}$$

where $I_{CHG}$ is the capacitor charging current (see FIG. 1), COUT is the capacitance of the output capacitor, dV is the output voltage, and dT is the target start up time. From EQ. 2, $$\frac{dV}{dT}$$

is the slew rate of the output voltage, which is across the output capacitor in the example of FIG. 1.

Figure 2:
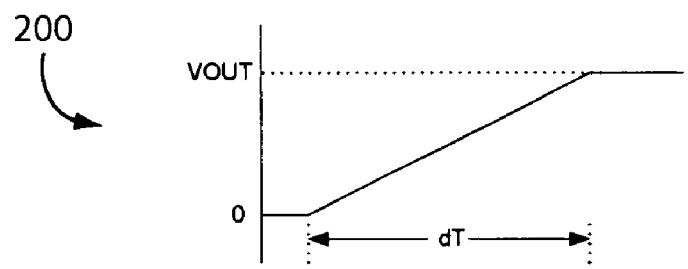
FIG. 2 shows a plot of an output voltage versus time starting from an output voltage of zero at start up.
Figure 3:
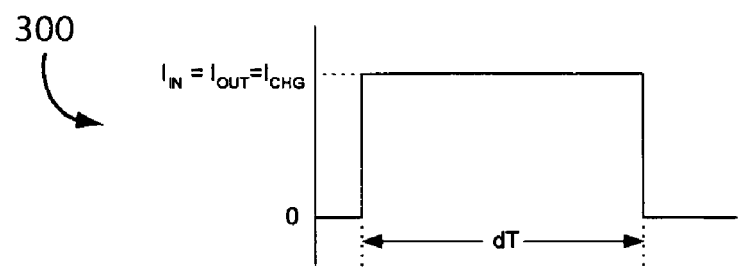
FIG. 3 shows a plot of an input current versus time in the case of a constant slew rate with no load during start up.
Figure 4:
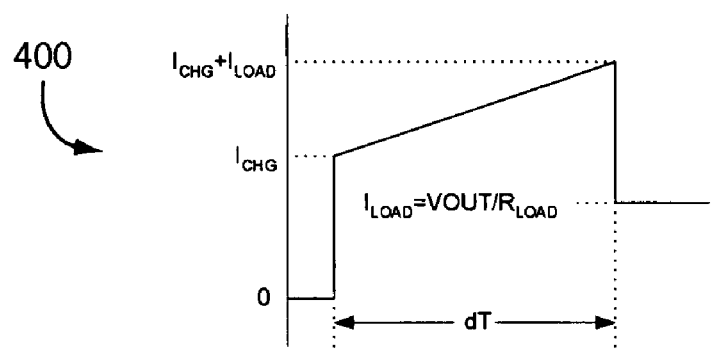
FIG. 4 shows a plot of an input current in the case of constant slew rate with a resistive load during start up.

FIG. 2 shows a plot 200 of the output voltage versus time starting from an output voltage of zero volt at start up. The change in output voltage (dV) over a period of time (dT) is the slew rate of the output voltage ("slew rate"), which is constant in the example of FIG. 2. FIG. 3 shows a plot 300 of the input current versus time in the case of a constant slew rate with no load during start up. Note that the input current is the same as the capacitor charging current because of the absence of a load current. FIG. 4 shows a plot of the input current in the case of constant slew rate with a resistive load at the output voltage during start up. It is generally desirable to control the slew rate such that it is within the target start up time and is relatively constant throughout the start up sequence. However, relatively constant slew rate is not readily realized using conventional current limit or stepped current circuits due to varying load current at start up.

Figure 5:
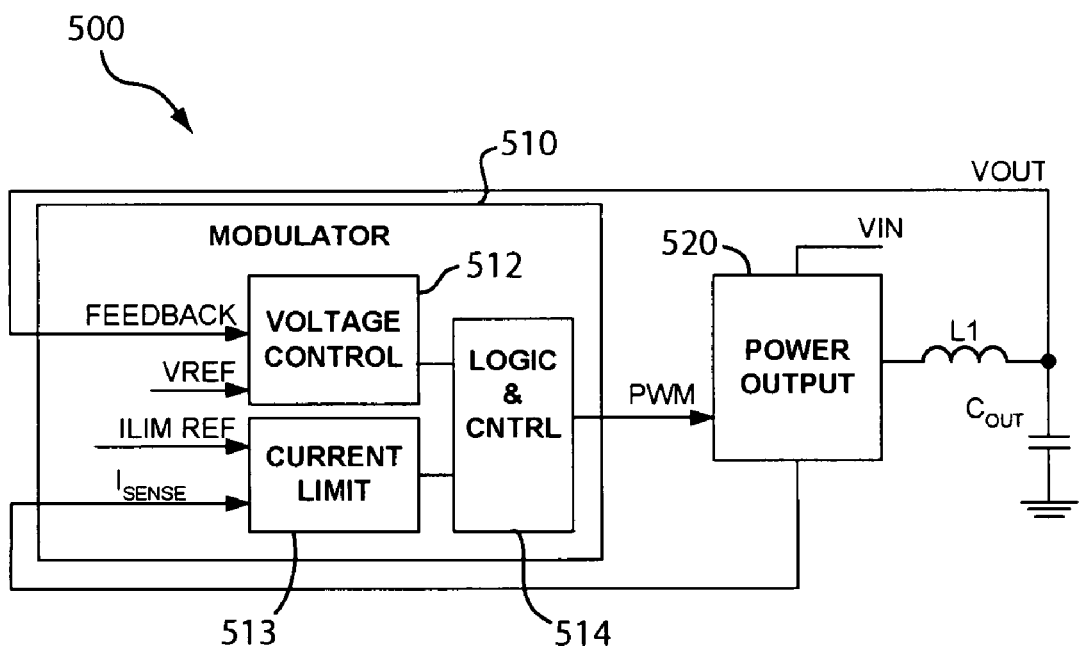
FIG. 5 schematically shows an example regulator that may be used with embodiments of the present invention.

FIG. 5 schematically shows an example regulator 500 that may be used with embodiments of the present invention. The regulator 500 may have a non-linear architecture to enhance its transient response. Embodiments of the present invention are especially useful with non-linear pulse width modulation (PWM) architectures as the embodiments may be configured to adapt to the load and maintain a relatively constant slew rate. Examples of such voltage regulators include PWM hysteretic, constant OFF time, and constant ON time regulators. A hysteretic voltage regulator is a regulator that uses two thresholds and a comparator to determine the ON time and OFF time of the PWM signal pulses. A constant ON time voltage regulator uses a one-shot to determine the ON time of the PWM signal pulses, and uses a comparator to determine when to fire a PWM signal pulse. A constant OFF time voltage regulator uses a comparator to turn off the PWM signal pulse, and a one-shot to determine the time between PWM signal pulses. It is to be noted, however, that embodiments of the present invention are not limited to particular regulator architectures. As such, the regulator 500 is described herein in the context of a basic PWM regulator for illustration purposes only.

The regulator 500 may include a modulator 510 and a power output stage, which comprises a power output circuit 520 and an output filter comprising an output inductor (L1) and an output capacitor ($C_{OUT}$). Depending on implementation, the power output circuit 520 may comprise a pair of synchronously switched transistors, or an asynchronously switched transistor and a diode.

The modulator 510 may include a voltage control circuit 512, current limit circuit 513, and logic and control circuit 514. The modulator 510 may comprise circuitry for performing pulse width modulation to maintain the output voltage at a regulated level. In the example of FIG. 5, the modulator 510 generates a PWM signal to control the power output circuit 520, which in turn controls the coupling of the input voltage (VIN) to the output filter. Generally speaking, during normal operation, the modulator 510 varies the width of the pulse of the PWM signal to control power delivery to the load (not shown) coupled to the output capacitor.

The voltage control circuit 512 receives the output voltage as a feedback signal (FEEDBACK), and compares the feedback signal to a voltage reference (VREF). The logic and control circuit 514 is coupled to the voltage control circuit 512 and controls the PWM signal based on the comparison of the feedback signal to the voltage reference. For example, the logic and control circuit 514 may decide to connect the output inductor to either the input voltage or ground depending on how the output voltage compares to the voltage reference. The current limit circuit 513 provides cycle by cycle current limit by comparing sensed feedback current ($I_{SENSE}$) to a current limit reference ("ILIM REF"). Generally speaking, the regulator 500 limits the output current to a value below the current limit, which is set by the current limit reference. The feedback current may comprise the output current measured from output transistors in the power output circuit 520, output inductor, a sense resistor, or other nodes or components. The logic and control circuit 514 is coupled to the current limit circuit 513 and controls the PWM signal to prevent the output current from exceeding the current limit in one or more regulation cycles.

In one embodiment, inrush current during start up is limited by controlling the slew rate. The slew rate may be controlled by adjusting the current limit to meet a target start up time. For example, the current limit may be increased when the slew rate is below a target slew rate, or decreased when the slew rate exceeds a maximum slew rate limit. Among other advantages, this technique allows for relatively constant slew rate, limits output overshoot by ensuring that the ending output current matches the load current at the end of the start up, can start into a partially or fully charged load, ensures that the first PWM signal pulse results in low output current, and is better suited to hysteretic control and other non-linear regulator architectures because it does not require a true zero volt starting point for reference. This technique is now introduced with reference to FIG. 6.

Figure 6:
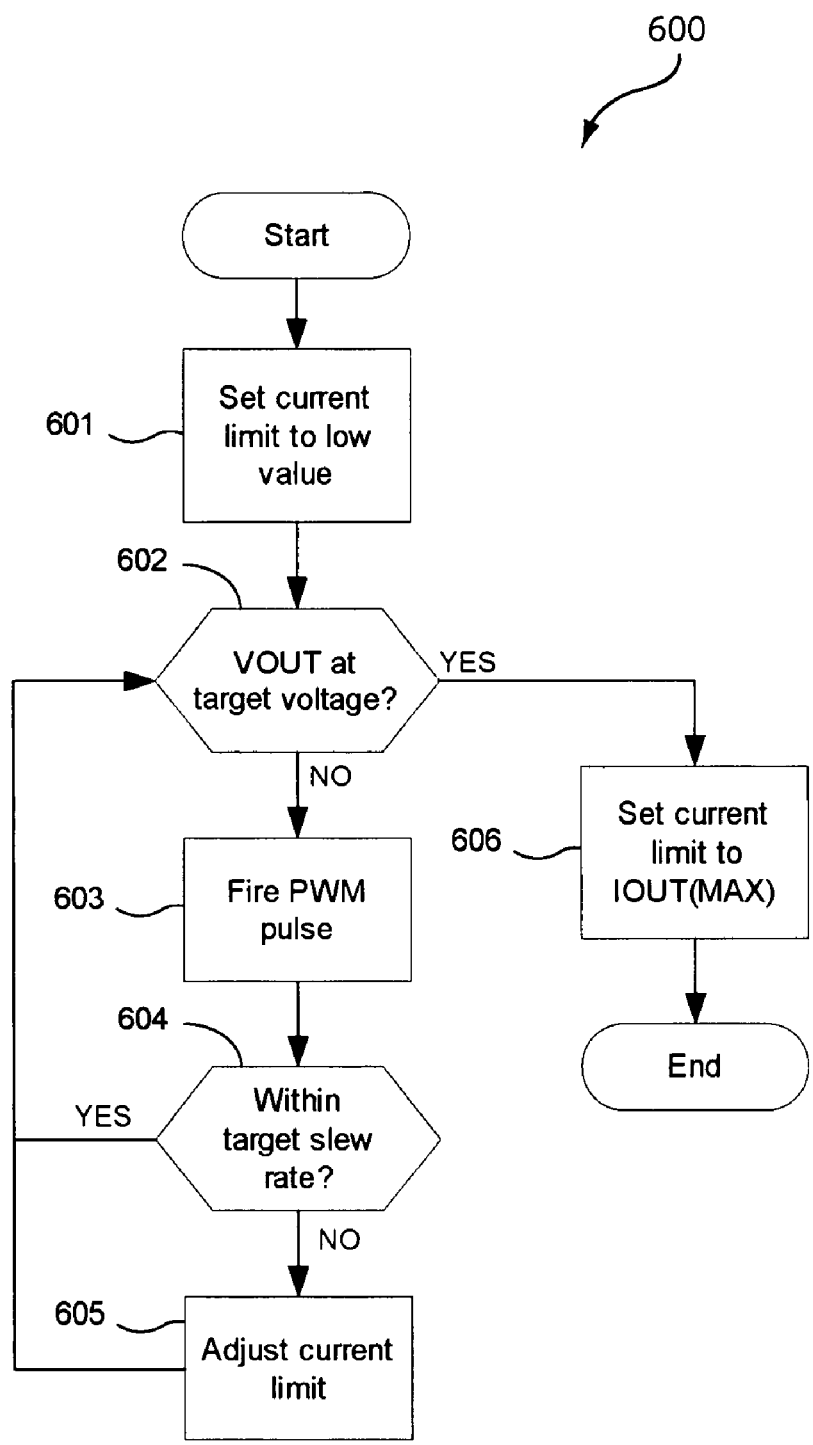
FIG. 6 shows a flow diagram of a method of controlling the slew rate of a voltage regulator output during start up in accordance with an embodiment of the present invention.

FIG. 6 shows a flow diagram of a method 600 of controlling the slew rate of a voltage regulator output during start up in accordance with an embodiment of the present invention. The method 600 may be performed by a soft start circuit, such as the soft start circuit 700 of FIG. 7, for example. The method 600 is explained using the regulator 500 as an example.

The method 600 begins with the soft start circuit setting the current limit of the regulator 500 to a low value (step 601). The current limit reference signal presented to the current limit circuit 513 may be set to a relatively low value to establish the initial slew rate. For example, in the case of the digital implementation shown in FIG. 10, a counter 108 may be set to its initial value of 1 to get a minimum current limit reference from a digital to analog converter (DAC) 109.

The soft start circuit monitors the slew rate to decide whether or not to increase the current limit. In one embodiment, the soft start circuit monitors the slew rate by comparing the value of the output voltage in a present regulation cycle to the value of the output voltage in the immediately preceding regulation cycle. For example, the soft start circuit may sample the output voltage at a regulation cycle and then compare that sample to the output voltage in the next regulation cycle. Knowing the time between samples, which in one embodiment is between PWM signal pulses during start up, and the difference between present and previous values of the output voltage, the soft start circuit has enough information to determine the slew rate.

The soft start circuit operates until the end of the start up sequence, also referred to as a "soft start." The end of the soft start may be sensed by the regulator 500 as the condition where the output voltage is maintained at the target regulated voltage level for one or more regulation cycles (step 602 to step 606). The current limit reference may be released at the end of the soft start (step 606). For example the soft start circuit may set the current limit of the regulator 500 to its maximum, predetermined operational value at the end of the soft start.

During the soft start, the regulator 500 fires PWM signal pulses to ramp to the target regulated voltage level (step 603). If the load current does not change, the initial slew rate will not change (step 604 to step 602) and will continue to remain relatively constant until the output voltage has reached its regulation target, which signifies the end of the soft start.

If the slew rate has changed, the soft start circuit determines if the slew rate is within a target slew rate (step 604). If so, the soft start circuit does not adjust the current limit to maintain the present slew rate (step 604 to step 602). This may be the case when the slew rate meets or exceeds the target slew rate, or is between a minimum slew rate limit and a maximum slew rate limit.

If the slew rate is not within the target slew rate, the soft start circuit adjusts the current limit to change the slew rate (step 604 to step 605). For example, the slew rate may be below the target slew rate. This may occur when the load current increases as the output rises, as is the case with a resistive load or a dynamic load that turns ON part way through the start up. In that case, the load will draw current away from charging the output capacitor, resulting in a decreased slew rate. When this happens, the soft start circuit increases the current limit to allow for more output current to charge the output capacitor and supply current to the load, thereby increasing the slew rate.

In some embodiments where the soft start circuit maintains the slew rate between a minimum slew rate limit and a maximum slew rate limit, the soft start circuit may increase the current limit to increase the slew rate above the minimum slew rate limit, or decrease the current limit to decrease the slew rate below the maximum slew rate limit.

Figure 7:
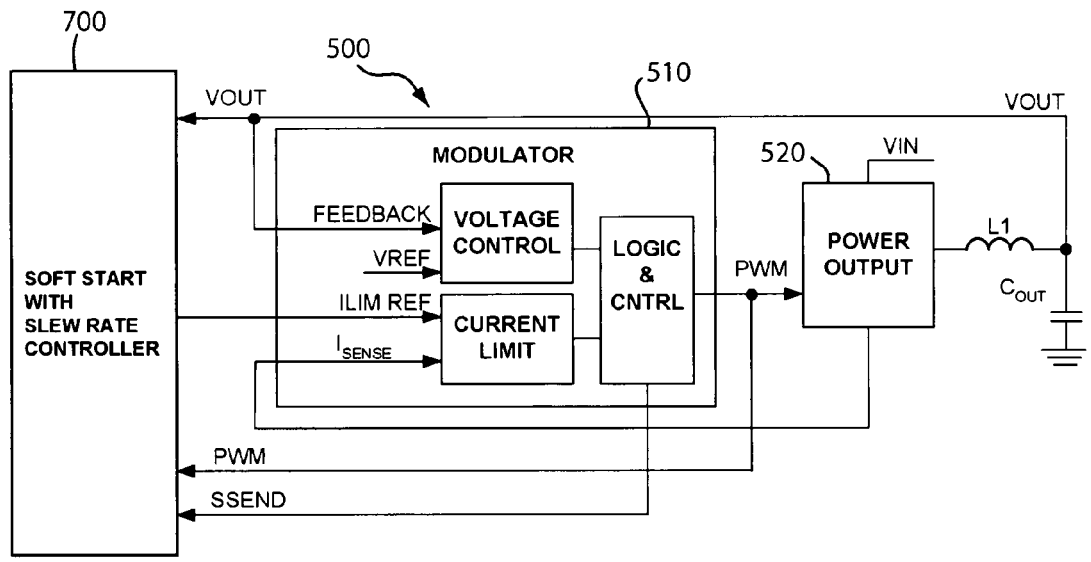
FIG. 7 schematically shows a soft start circuit with slew rate controller being used in conjunction with the regulator of FIG. 5, in accordance with an embodiment of the present invention.

FIG. 7 schematically shows the soft start circuit 700 being used with the regulator 500, in accordance with an embodiment of the present invention. The soft start circuit 700 may perform the method 600 to control the slew rate of the output voltage. As shown in FIG. 7, the soft start circuit 700 may receive the output voltage, the PWM signal, and a soft start end signal (SSEND) from the regulator 500. The soft start circuit 700 may use the PWM signal as a clock for sampling the output voltage and comparing the previous and present values of the output voltage to determine the slew rate. The soft start end signal alerts the soft start circuit 700 of the end of the start up sequence.

Figure 8:
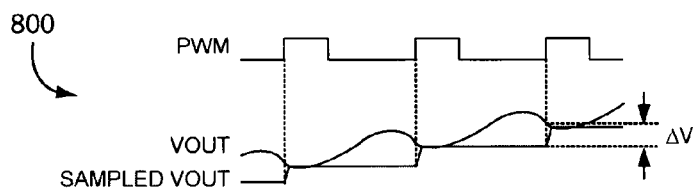
FIG. 8 shows a timing diagram illustrating the relationship between a PWM signal, output voltage, and sampled output voltage in the circuit of FIG. 7.

FIG. 8 shows a timing diagram 800 illustrating the relationship between the PWM signal (labeled as "PWM"), the output voltage (labeled as "VOUT"), and the sampled output voltage (labeled as "SAMPLED VOUT") in the circuit of FIG. 7. The difference between the sampled and present values of the output voltage is labeled as "ΔV." Since the time between PWM signal pulses is known, ΔV is indicative of the slew rate of the output voltage. FIG. 8 shows the case where the slew rate is within the target slew rate due to a relatively constant load. The output voltage sufficiently increases between successive regulation cycles. This is a case where the soft start circuit 700 does not adjust the current limit to maintain the slew rate at its present value.

Figure 9:
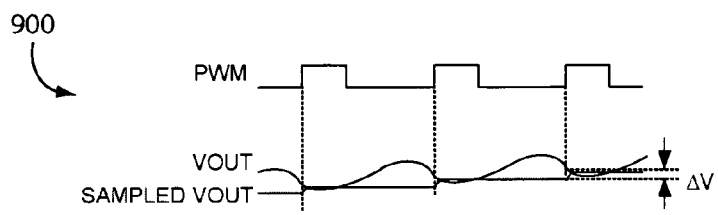
FIG. 9 shows a timing diagram of the PWM signal, the output voltage, and the sampled output voltage in the circuit of FIG. 7 in the case where the slew rate decreases.

FIG. 9 shows a timing diagram 900 of the PWM signal, the output voltage, and the sampled output voltage in the circuit of FIG. 7 in the case where the slew rate decreases, as indicated by the smaller ΔV in FIG. 9 compared to FIG. 8. The decreasing slew rate may be due to an increasing load current, for example. This is a case where the soft start circuit 700 increases the current limit to increase the slew rate.

Figure 10:
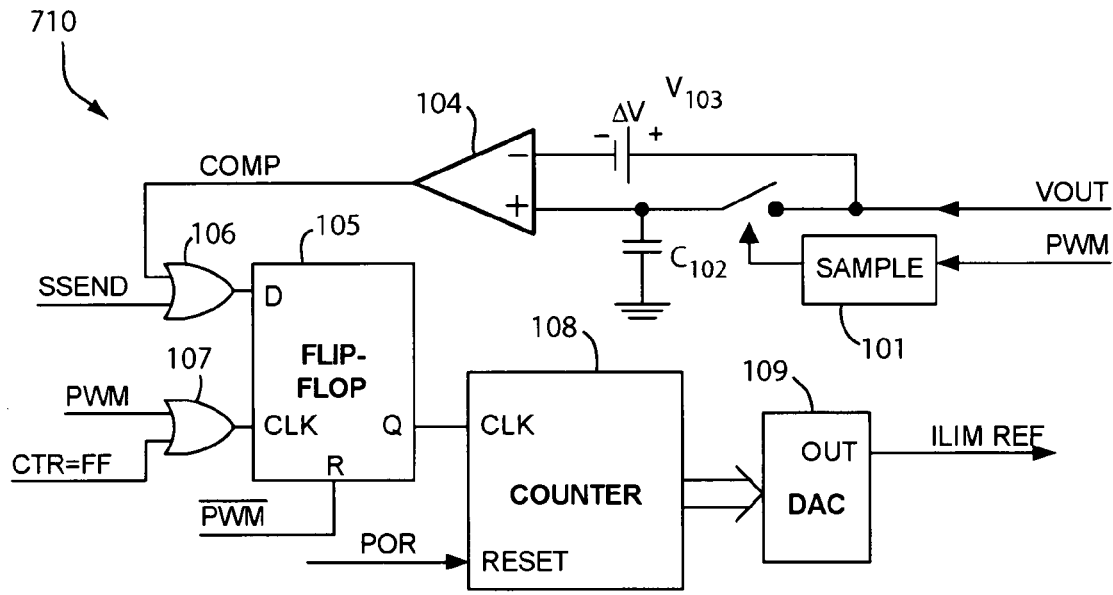
FIG. 10 schematically shows a soft start circuit with slew rate controller in accordance with an embodiment of the present invention.

Referring now to FIG. 10, there is schematically shown a soft start circuit 710 with slew rate controller in accordance with an embodiment of the present invention. The soft start circuit 710 is a particular embodiment of the soft start circuit 700 of FIG. 7. As such, the soft start circuit 710 may receive the output voltage ("VOUT"), PWM signal ("PWM"), and soft start end ("SSEND") signal from the regulator 500 or another voltage regulator.

The soft start circuit 710 may include a sample and hold circuit comprising a sampling circuit 101 and a capacitor $C_{102}$. The sampling circuit 101 may comprise a switch configured to couple the output voltage to the capacitor $C_{102}$ for sampling. In the example of FIG. 10, the sampling circuit 101 is clocked by the PWM signal to generate a SAMPLE signal (see FIG. 11) that closes a switch to couple the output voltage to the capacitor $C_{102}$. For example, the output voltage may be stored in the capacitor $C_{102}$ during the rising edge of the PWM signal. This allows values of the output voltage in succeeding regulation cycles to be compared.

The output voltage is coupled to a comparator 104 by way of a voltage source $V_{103}$ (e.g., 5 mV) that subtracts a voltage (ΔV) from VOUT. The comparator output (i.e., COMP signal) is positive when the output voltage is less than the sampled output voltage plus the voltage ΔV, and negative when the output voltage exceeds the sampled output voltage plus the voltage ΔV. In one embodiment, the absence of a negative power supply powering the comparator 104 results in the negative comparator output being a ground signal. A negative comparator output may thus be interpreted as a logical LOW, while a positive comparator output may be interpreted as a logical HIGH.

In the example of FIG. 10, a logical HIGH comparator output indicates that the slew rate is below the target slew rate, while a logical LOW comparator output indicates that the slew rate meets or exceeds the target slew rate. The voltage ΔV may be programmed for a particular target slew rate by selecting a value for the voltage source $V_{103}$ that takes into account the PWM cycle time. For example, assuming a target slew rate of 5 mV/uS, PWM cycle time of 1 Mhz, the voltage ΔV may be set to 5 mV. A regulator with a 2V target output voltage may thereby achieve regulation in about 400 uS.

The output of the comparator 104 is input to a D-type flip-flop 105 by way of an OR gate 106. A logical HIGH comparator output results in a logical HIGH being stored into the flip-flop 105 when the PWM signal clocks the flip-flop 105 by way of the OR gate 107. This results in the flip-flop 105 generating a logical HIGH signal that clocks a counter 108 to increment. A logical LOW comparator output does not force the OR gate 106 to feed a logical HIGH into the flip-flop 105. If both the comparator output and the soft start end signal are at a logical LOW, a logical LOW is stored in the flip-flop 108. The counter 108 is not clocked, and therefore does not increment its count, in that situation. The rising edge of the complement of the PWM signal is used to reset the flip-flop 105 for the next regulation cycle.

In the example of FIG. 10, the soft start end signal is also fed to the input of the flip-flop 105 by way of the OR gate 106. This results in a constant logical HIGH being applied to the flip-flop 105, forcing the counter 108 to increment with each regulation cycle to reach its maximum count, at the end of the start up. The counter 108 may be configured such that its maximum count results in the soft start circuit 710 releasing control of the current limit. In one embodiment, the soft start circuit 710 releases control of the current limit by placing it at its maximum operational value. The soft start end signal forces the counter 108 to count to its maximum to release control of the current limit in a smooth fashion. A maximum count signal (labeled as "CTR=FF") is fed to the clock input of the flip-flop 105 by way of the OR gate 107 to allow for continuous clocking of the flip-flop 105 when the counter 108 has reached its maximum count. The maximum count signal may be generated by another circuit (not shown) from the count value of the counter 108.

The counter 108 may be an incremental up counter that does not roll over (i.e., stops counting after reaching its maximum count), for example. In one embodiment, the counter 108 starts with a count value of 1 and ends with a count value of 0xFF (i.e., FF hexadecimal), for example. A power on reset signal ("POR") generated by an external circuit (not shown) initializes the counter 108 to its starting count value upon power up.

The count value of the counter 108 feeds the input of the DAC 109, which converts the count to an analog current limit reference ("ILIM REF") signal used to control the current limit of the regulator 500. The DAC 109 may be configured to generate the maximum operational current limit reference when the counter 108 counts to its maximum count value.

Figure 11:
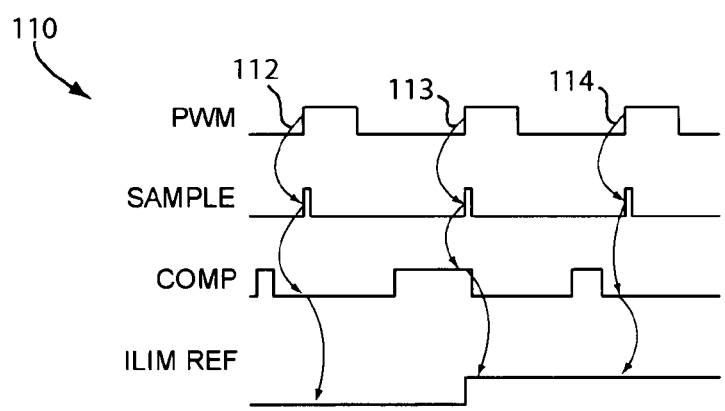
FIG. 11 shows a timing diagram illustrating the relationship between a PWM signal, sample signal generated by a sampling circuit, output of a comparator, and current limit reference in the soft start circuit of FIG. 10.

FIG. 11 shows a timing diagram 110 illustrating the relationship between the PWM signal ("PWM"), the sample signal ("SAMPLE") generated by the sampling circuit 101, the output of the comparator 104 ("COMP") and the current limit reference ("ILIM REF") in the soft start circuit 710.

Referring to the series of lines labeled as 112, the rising edge of the PWM signal triggers the sampling circuit 101 to generate the sample signal to sample the output voltage. In this regulation cycle, the comparator output is at a logical LOW, indicating that the output voltage has sufficiently increased from the previous regulation cycle. That is, the slew rate meets the target slew rate. Accordingly, the counter 108 is maintained at its present count to keep the current limit reference at its present value to maintain the slew rate.

In the series of lines labeled as 113, the rising edge of the PWM signal triggers the sampling circuit 101 to generate the sample signal to sample the output voltage. Unlike in the immediately previous regulation cycle, the comparator output is at a logical HIGH, indicating that the slew rate is below the target slew rate. Accordingly, the counter 108 is incremented to increase the current limit reference, thereby increasing the output current to compensate.

In the series of lines labeled as 114, the rising edge of the PWM signal triggers the sampling circuit 101 to generate the sample signal to sample the output voltage. In this regulation cycle, the comparator output is at a logical LOW, indicating that the output voltage has sufficiently increased from the previous regulation cycle to meet the target slew rate. Accordingly, the counter 108 is maintained at its present count to keep the current limit reference at its present value to maintain the slew rate.

The soft start circuit 710 includes digital circuits in the form of the counter 108 and the DAC 109 to set the current limit reference. However, this is not necessarily the case as the soft start circuit 710 may also employ analog circuits to set the current limit reference as now explained with reference to FIG. 12.

Figure 12:
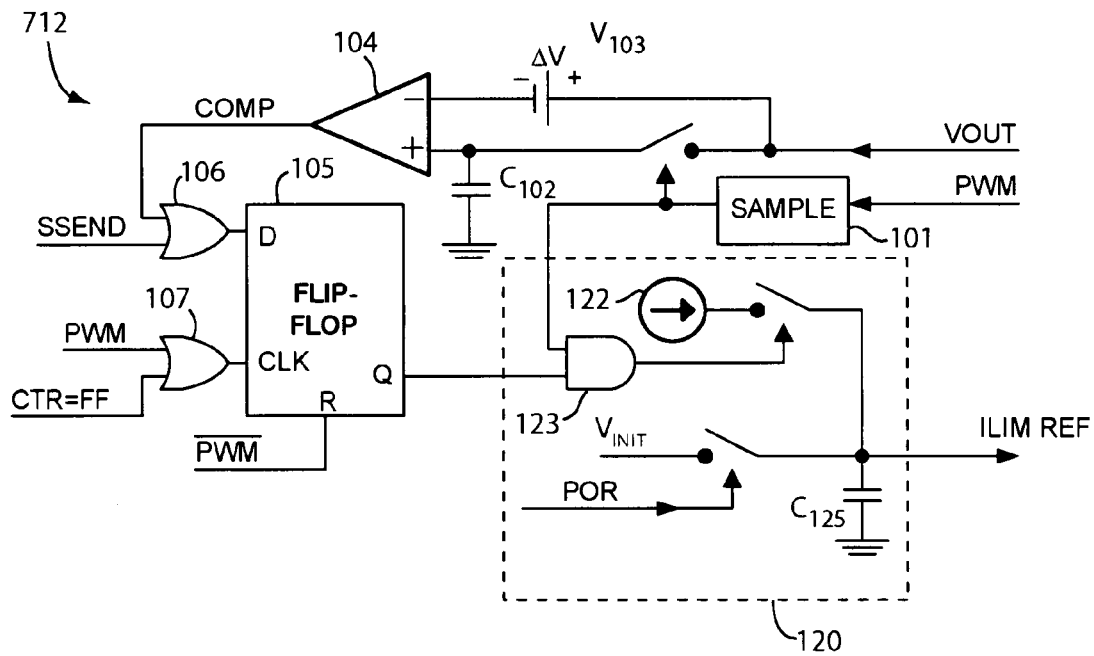
FIG. 12 schematically shows a soft start circuit with slew rate controller in accordance with another embodiment of the present invention.

FIG. 12 schematically shows a soft start circuit 712 with slew rate controller in accordance with an embodiment of the present invention. The soft start circuit 712 is a particular embodiment of the soft start circuit 700 of FIG. 7. As such, the soft start circuit 712 may receive the output voltage ("VOUT"), PWM signal ("PWM"), and soft start end ("SSEND") signal from the regulator 500 or another voltage regulator.

The soft start circuit 712 is the same as the soft start circuit 710 except for the use of a current limit reference generator 120, rather than the counter 108 and the DAC 109. In the example of FIG. 12, the sample signal generated by the sampling circuit 101 not only couples the output voltage to the capacitor $C_{102}$ for sampling, but also allows a current source 122 to pulse, and thereby charge, a capacitor $C_{125}$ that holds the value for the current limit. The sample signal is gated by the output of the flip-flop 105 by way of the AND gate 123. Thus, in operation, the capacitor $C_{125}$ is charged by the current source 122 to increase the current limit whenever the slew rate is below the target slew rate. The capacitor $C_{125}$ is not charged when the slew rate exceeds the target slew rate. The operation and components of the soft start circuits 712 and 710 are otherwise the same.

The above-described soft start circuits control the voltage regulator to maintain a minimum slew rate. In other embodiments, such as now described with reference to FIG. 13, the soft start circuit may be configured to keep the slew rate above a minimum slew rate and below a maximum slew rate.

Figure 13:
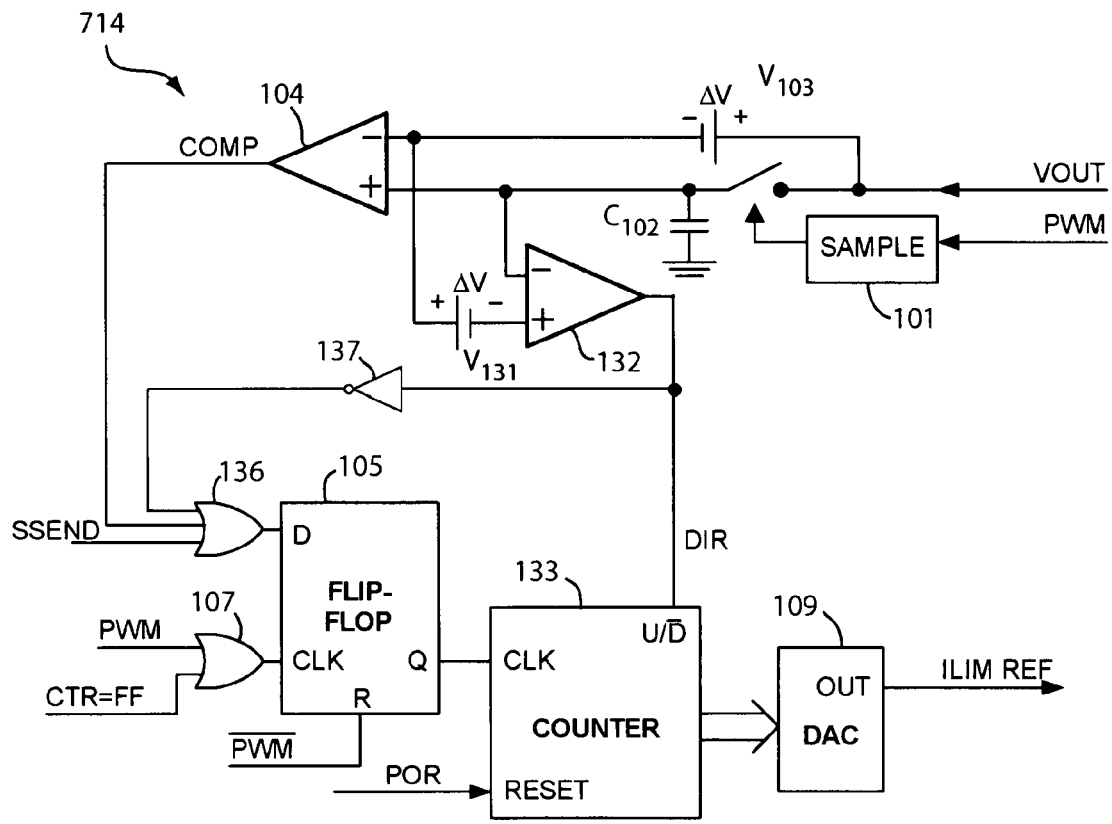
FIG. 13 schematically shows a soft start circuit with slew rate controller in accordance with yet another embodiment of the present invention.

FIG. 13 schematically shows a soft start circuit 714 with slew rate controller in accordance with an embodiment of the present invention. The soft start circuit 714 is a particular embodiment of the soft start circuit 700 of FIG. 7. As such, the soft start circuit 714 may receive the output voltage ("VOUT"), PWM signal ("PWM"), and soft start end ("SSEND") signal from the regulator 500 or another voltage regulator.

Generally speaking, the soft start circuit 714 is the same as the soft start circuit 710 except for the use of an additional comparator 132, an inverter 137, and a voltage source $V_{131}$. The soft start circuit 714 also uses an up/down counter 133 in place of the up counter 108, and an OR gate 136 in place of the OR gate 106. Like the counter 108, the counter 133 does not roll over and may count from an initial value of 1 to a maximum count (e.g., 0xFF). Unlike the counter 108, however, the counter 133 decrements or increments depending on the signal at its up/down (U/D) input node. The counter 133 is configured not to decrement below a count value of 1. Also in the soft start circuit 714, the OR gate 136 includes an additional input to allow the direction signal DIR of the comparator 132 to be input to the flip-flop 105 by way of the additional inverter 137.

In the example of FIG. 13, the voltage source $V_{131}$ is sized the same as the $V_{103}$ to subtract another voltage $\Delta V$ from the output voltage. Accordingly, the direction signal DIR is positive when the output voltage is less than the sampled output voltage plus twice the voltage $\Delta V$, and negative when the output voltage exceeds the sampled output voltage plus twice the voltage $\Delta V$. In one embodiment, the absence of a negative power supply powering the comparator 133 results in the negative output being a ground signal. A negative comparator output may thus be interpreted as a logical LOW, while a positive comparator output may be interpreted as a logical HIGH.

In the example of FIG. 13, the maximum allowable slew rate is set at twice the target or minimum slew rate. This maximum allowable slew rate may be programmed by selecting appropriate value of voltage source $V_{131}$ taking into account the PWM cycle time and the expected output voltage. For example, assuming a minimum slew rate of 5 mV/uS, maximum allowable slew rate of 10 mV/uS, PWM cycle time of 1 uS, and an expected output voltage of 2V, the voltage source $V_{103}$ may have a value of 5 mV and the voltage source $V_{131}$ may have a value of 5 mV. With these conditions, the regulator may achieve regulation in at least 400 uS, but not sooner than 200 uS. As in the soft start circuit 710, the minimum allowable slew rate in the soft start circuit 714 is set by the voltage source $V_{103}$.

Still referring to FIG. 13, the direction signal DIR at a logical HIGH indicates that the output voltage slew rate is below the minimum allowable slew rate. This is a situation where the counter 133 is incremented to increase the output of the DAC 109, thereby increasing the current limit as in the soft start 710.

The direction signal DIR at a logical LOW indicates that the output voltage slew rate is greater than the maximum allowable slew rate. In that case, the logical LOW signal DIR results in the counter 133 being decremented when the flip-flop 105 outputs a logical HIGH in response to the output of the comparator 132 being at a logical LOW. This decreases the current limit reference output of the DAC 109, thereby decreasing the slew rate to below the maximum allowable slew rate. The operation and components of the soft start circuits 714 and 710 are otherwise the same.

As can be appreciated from the foregoing, embodiments of the present invention improve on conventional soft start circuits by incorporating a novel slew rate controller. This results in a controlled slew rate at the output even with varying load current, and limited overshoot by matching the ending output current to the load current. Embodiments of the present invention are also better suited to hysteretic controlled regulators compared to conventional soft start circuits, as the embodiments can be configured to accommodate hysteresis near zero volts.

Improved soft start circuits with slew rate controller have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling a slew rate of a voltage regulator during start up, the method comprising: measuring a slew rate of an output voltage of a voltage regulator to get a detected slew rate value during startup of the regulator from a power OFF state; determining the slew rate by comparing the output voltage to a sampled value of the output voltage taken at a previous pulse width modulation (PWM) regulation cycle; and adjusting the current limit of the regulator to control the slew rate based on the detected slew rate value during start up.

2. The method of claim 1 wherein monitoring the slew rate of the regulator comprises:
   sampling the output voltage at a first PWM regulation cycle to get a first output voltage value;
   sampling the output voltage at a second PWM regulation cycle immediately following the first PWM regulation cycle to get a second output voltage value; and
   comparing the first output voltage value to the second output voltage value to determine the slew rate.

3. The method of claim 1 wherein adjusting the current limit of the regulator comprises:
   increasing the current limit of the regulator to increase the slew rate.

4. The method of claim 3 wherein increasing the current limit of the regulator comprises:
   incrementing a counter;
   inputting a count output of the counter to a digital to analog converter (DAC) that generates a current limit reference signal based on the count output; and
   using the current limit reference signal generated by the DAC to set the current limit of the regulator.

5. The method of claim 3 wherein increasing the current limit of the regulator comprises:
   charging a capacitor that provides a current limit reference to the regulator.

6. The method of claim 5 wherein the capacitor is charged by a current source that sends a pulsed signal to the capacitor when the slew rate is below a target slew rate.

7. The method of claim 1 wherein adjusting the current limit of the regulator comprises:
   decreasing the current limit of the regulator to decrease the slew rate.

8. The method of claim 1 wherein the current limit of the regulator is not adjusted when the slew rate is within a target slew rate.

9. The method of claim 1 further comprising:
   releasing control of the current limit of the regulator after the start up.

10. The method of claim 9 wherein releasing control of the current limit of the regulator comprises setting the current limit to its maximum operational value.

11. An electrical circuit comprising: a first circuit configured to determine a slew rate of an output voltage of a voltage regulator during a start up of the regulator by comparing the output voltage to a sampled value of the output voltage taken at a previous pulse width modulation (PWM) regulation cycle; and a second circuit configured to adjust a current limit of the regulator to control the slew rate during start up, the second circuit adjusting the current limit based on the slew rate determined by the first circuit.

12. The electrical circuit of claim 11 wherein the first circuit comprises:
   a sampling circuit configured to couple the output to a capacitor for sampling; and
   a first comparator configured to compare the output to a previous sampled value of the output.

13. The electrical circuit of claim 12 wherein the first circuit further comprises:
   a second comparator configured to compare the output to the previous sampled value of the output to determine if the slew rate exceeds a maximum slew rate limit.

14. The electrical circuit of claim 11 wherein the second circuit comprises:
   a counter having a count configured to increment when the slew rate is below a target slew rate; and
   a digital to analog converter configured to output a current limit reference for adjusting the limit of the regulator based on the count of the counter.

15. The electrical circuit of claim 14 wherein the counter is further configured to decrement when the slew rate is above a maximum slew rate limit.

16. The electrical circuit of claim 11 wherein the voltage regulator comprises a hysteretic voltage regulator.

17. A method of controlling a slew rate of a voltage regulator during start up, the method comprising:
   setting a current limit of a voltage regulator to a first current limit value during a start up sequence of the regulator;

measuring a slew rate of an output voltage of the regulator by comparing the output voltage to a sampled value of the output voltage taken at a previous pulse width modulation regulation cycle; and using the measured slew rate to determine whether to adjust the current limit during the start up.

18. The method of claim 17 further comprising:

increasing the current limit from the first current limit value to a higher second current limit value when the measured slew rate is below a target slew rate.

19. The method of claim 17 further comprising:

decreasing the current limit from the first current limit value to a lower second current limit value when the measured slew rate is above a target slew rate.

20. The method of claim 17 wherein the first current limit value is an initial current limit value set at a beginning of the start up sequence.

* * * * *